USO09779374B2

(12) United States Patent
Luwang et al.

(10) Patent No.: US 9,779,374 B2
(45) Date of Patent: Oct. 3, 2017

(54) SYSTEM AND METHOD FOR TASK ASSIGNMENT IN WORKFLOWS (71) Applicants: Tianyu Luwang, Shanghai (CN); Wen-Syan Li, Fremont, CA (US)

(72) Inventors: Tianyu Luwang, Shanghai (CN); Wen-Syan Li, Fremont, CA (US)

(73) Assignee: SAP SE, Walldorf (DE)

( * ) Notice: Subject to any disclaimer, the term of this patent is extended or adjusted under 35 U.S.C. 154(b) by 340 days.

(21) Appl. No.: 14/036,867

(22) Filed: Sep. 25, 2013

(65) Prior Publication Data
US 2015/0088571 A1 Mar. 26, 2015

(51) Int. Cl.
*G06Q 10/00* (2012.01)
*G06Q 10/06* (2012.01)

(52) U.S. Cl.
CPC .................. *G06Q 10/063118* (2013.01)

(58) Field of Classification Search
CPC ............................................. G06Q 10/00–90/00
USPC .................................................. 705/7.11–7.42
See application file for complete search history.

(56) References Cited

U.S. PATENT DOCUMENTS

| 5,301,320 A |   | 4/1994 | McAtee et al. |  |
|---|---|---|---|---|
| 5,392,429 A | * | 2/1995 | Agrawal | G06F 17/12 708/446 |
| 5,408,663 A | * | 4/1995 | Miller | G06Q 10/06 718/104 |
| 6,088,678 A |   | 7/2000 | Shannon |  |
| 6,345,240 B1 | * | 2/2002 | Havens | G06F 9/5027 700/100 |
| 6,356,880 B1 | * | 3/2002 | Goossens | G06Q 40/12 705/30 |
| 6,735,596 B2 |   | 5/2004 | Corynen |  |
| 7,062,448 B2 |   | 6/2006 | Trautmann et al. |  |
| 7,318,038 B2 |   | 1/2008 | Labbi |  |
| 7,500,001 B2 | * | 3/2009 | Tameshige | G06F 9/5011 709/223 |
| 7,676,490 B1 | * | 3/2010 | Cassone | G06Q 10/06 705/37 |
| 7,937,280 B1 | * | 5/2011 | Leung | G06Q 10/06 705/6 |
| 7,949,663 B1 | * | 5/2011 | Cassone | G06Q 10/06 705/306 |

(Continued)

FOREIGN PATENT DOCUMENTS

CH     EP 1355246 A1 * 10/2003 ............. G06Q 10/06

OTHER PUBLICATIONS

Abrishami, Saeid, Mahmoud Naghibzadeh, and Dick HJ Epema. "Cost-driven scheduling of grid workflows using partial critical paths." IEEE Transactions on Parallel and Distributed Systems 23.8 (2012): 1400-1414.*

(Continued)

*Primary Examiner* — Alan S Miller
(74) *Attorney, Agent, or Firm* — Brake Hughes Bellermann LLP (57) ABSTRACT

The method includes determining an assignment completion time distribution based on a task set defining a project, determining a project completion time distribution based on the assignment completion time distribution and the task set, determining a project cost based on assignments of the task set, and generating a list of project task assignments based on the project cost and the project completion time distribution.

22 Claims, 7 Drawing Sheets

(56) References Cited

U.S. PATENT DOCUMENTS

| | | | |
|---|---|---|---|
| 7,983,940 B2 | 7/2011 | Hagmann et al. | |
| 7,983,946 B1* | 7/2011 | Cassone | G06Q 10/06 705/7.36 |
| 8,028,293 B2* | 9/2011 | Azar | G06F 9/4881 709/226 |
| 8,275,644 B2 | 9/2012 | Cases et al. | |
| 8,276,143 B2* | 9/2012 | Vengerov | G06F 9/5083 718/102 |
| 8,302,097 B2* | 10/2012 | Buco | G06F 9/4887 718/102 |
| 8,311,872 B2 | 11/2012 | Fishman | |
| 8,321,870 B2* | 11/2012 | Messier | G06F 9/5066 709/201 |
| 8,458,009 B1* | 6/2013 | Southworth | G06Q 10/06 705/1.1 |
| 8,595,735 B2* | 11/2013 | Doyle | G06F 9/4881 709/226 |
| 8,930,954 B2* | 1/2015 | Hildrum | G06F 9/4881 718/102 |
| 9,015,723 B2* | 4/2015 | Gilat | G06F 9/4881 718/104 |
| 9,128,763 B2* | 9/2015 | Sarkar | G06F 9/505 |
| 2003/0018762 A1* | 1/2003 | Mullen | H04Q 3/64 709/223 |
| 2004/0111509 A1* | 6/2004 | Eilam | H04L 67/1008 709/224 |
| 2004/0243457 A1* | 12/2004 | D'Andrea | G06Q 10/06 705/7.23 |
| 2005/0027585 A1 | 2/2005 | Wodtke et al. | |
| 2005/0065826 A1* | 3/2005 | Baker | G06Q 10/063 705/40 |
| 2005/0216324 A1* | 9/2005 | Maithell | G06Q 10/06 705/7.22 |
| 2006/0277544 A1 | 12/2006 | Bjoernsen et al. | |
| 2008/0005744 A1* | 1/2008 | Buco | G06Q 10/06 718/105 |
| 2008/0082933 A1* | 4/2008 | Howard | G06F 9/5072 715/771 |
| 2008/0243575 A1* | 10/2008 | Weinberger | G06Q 10/06 705/7.13 |
| 2009/0222275 A1* | 9/2009 | Cantor | G06Q 10/06 705/308 |
| 2009/0327106 A1 | 12/2009 | Bartelt et al. | |
| 2010/0082607 A1* | 4/2010 | Punera | G06F 17/30867 707/723 |
| 2010/0228682 A1 | 9/2010 | Ikeda et al. | |
| 2011/0072436 A1* | 3/2011 | Gilat | G06F 9/4881 718/104 |
| 2011/0106509 A1 | 5/2011 | Mercier et al. | |
| 2011/0173626 A1* | 7/2011 | Chi | G06F 9/5072 718/103 |
| 2011/0302090 A1* | 12/2011 | Newpol | G06Q 10/06 705/301 |
| 2013/0073328 A1 | 3/2013 | Ehrler et al. | |
| 2013/0103615 A1 | 4/2013 | Mun | |
| 2013/0325763 A1* | 12/2013 | Cantor | G06Q 10/0633 706/12 |
| 2014/0114717 A1* | 4/2014 | Davis | G06Q 10/1097 705/7.21 |
| 2014/0142998 A1* | 5/2014 | Kroeger | G06Q 10/06311 705/7.13 |
| 2014/0222485 A1* | 8/2014 | Cantor | G06Q 10/0633 705/7.22 |
| 2015/0006122 A1* | 1/2015 | Du | G06F 17/5009 703/2 |

OTHER PUBLICATIONS

Yu, Jia, Rajkumar Buyya, and Chen Khong Tham. "QoS-based scheduling of workflow applications on service grids." Proc. of 1st IEEE International Conference on e-Science and Grid Computing. 2005.*

Yao, W. (2012). "Context-aware design for process flexibility and adaptation" Available from ProQuest Dissertations & Theses Global. (1269505333).*

* cited by examiner

SYSTEM AND METHOD FOR TASK ASSIGNMENT IN WORKFLOWS

FIELD

Embodiments relate to assigning tasks in workflows or projects. More specifically, embodiments relate to using quantitative methods to guide task assignment decisions.

BACKGROUND

A business project generally includes a plurality of tasks. Some tasks are typically dependent on other tasks. The dependent tasks typically should start after other tasks are finished. Typically, the tasks of a project are organized as a workflow, which should follow a plurality of constraints (e.g., the finish time of the project and the resources could be assigned to different tasks). The assignment of available resources to different tasks in a proper way so that all the constraints could be fulfilled while other business objectives could be optimized (e.g., maximizing profit) is typically a goal of task assignment.

For simple projects, task assignment can be performed by experienced management personnel (even considering the above constraints). However, with the increase of productivity and the rapid development of globalization, business projects become so large and complex that the optimal assignment decision can not be determined based only on the previous experience of management (or other organizational) personnel.

The task assignment problem could be formalized as an optimization problem. But the optimization is difficult for large projects. Global optimization methods need to check all possible assignment combinations and find out the optimal feasible combination. These methods are computationally expensive and usually impossible to compute under current information technology (IT) infrastructures for large projects. As an example, for a project with 20 tasks, assuming each task has 5 candidate ways to be assigned, the total number of combinations is $5^{20} \approx 9.5 \times 10^{13}$. Some methods could filter out all infeasible combinations and do not need to investigate all feasible combinations. However, the methods still need large amounts of computation time and suffer from a lack of scalability to larger projects. Deterministic local optimization methods check the assignment combinations of limited number of tasks while keeping the assignment of other tasks fixed. These methods are conducted in an iterative manner. During each iteration a small number of tasks are randomly selected. The algorithm determines the optimal assignment for these tasks and replaces previous assignment of these tasks. The process is run until no further improvement could be achieved. Deterministic local optimization methods are guaranteed to converge. However, they often get stuck in local optima that are far from global optimal.

Accordingly, there is a need to address the aforementioned problems by providing quantitative methods to guide the task assignment decision. The quantitative methods should minimize or reduce the use of deterministic local optimization methods so as to minimize or reduce the use of IT resources.

SUMMARY

One embodiment includes a method. The method includes determining an assignment completion time distribution based on a task set defining a project, determining a project completion time distribution based on the assignment completion time distribution and the task set, determining a project cost based on assignments of the task set, and generating a list of project task assignments based on the project cost and the project completion time distribution.

Another embodiment includes a non-transitory computer-readable storage medium having stored thereon computer executable program code which, when executed on a computer system, causes the computer system to perform steps. The steps include determining an assignment completion time distribution based on a task set defining a project, determining a project completion time distribution based on the assignment completion time distribution and the task set, determining a project cost based on assignments of the task set, and generating a list of project task assignments based on the project cost and the project completion time distribution.

Still another embodiment includes an apparatus including a processor and a non-transitory computer readable medium. The apparatus further includes a task assignment module configured to determine an assignment completion time distribution based on a task set defining a project, a project completion module configured to determine a project completion time distribution based on the assignment completion time distribution and the task set, a project cost module configured to determine a project cost based on assignments of the task set, and an assignment combination module configured to generate a list of project task assignments based on the project cost and the project completion time distribution.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

It should be noted that these Figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the positioning of structural elements may be reduced or exaggerated for

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Figure 1:
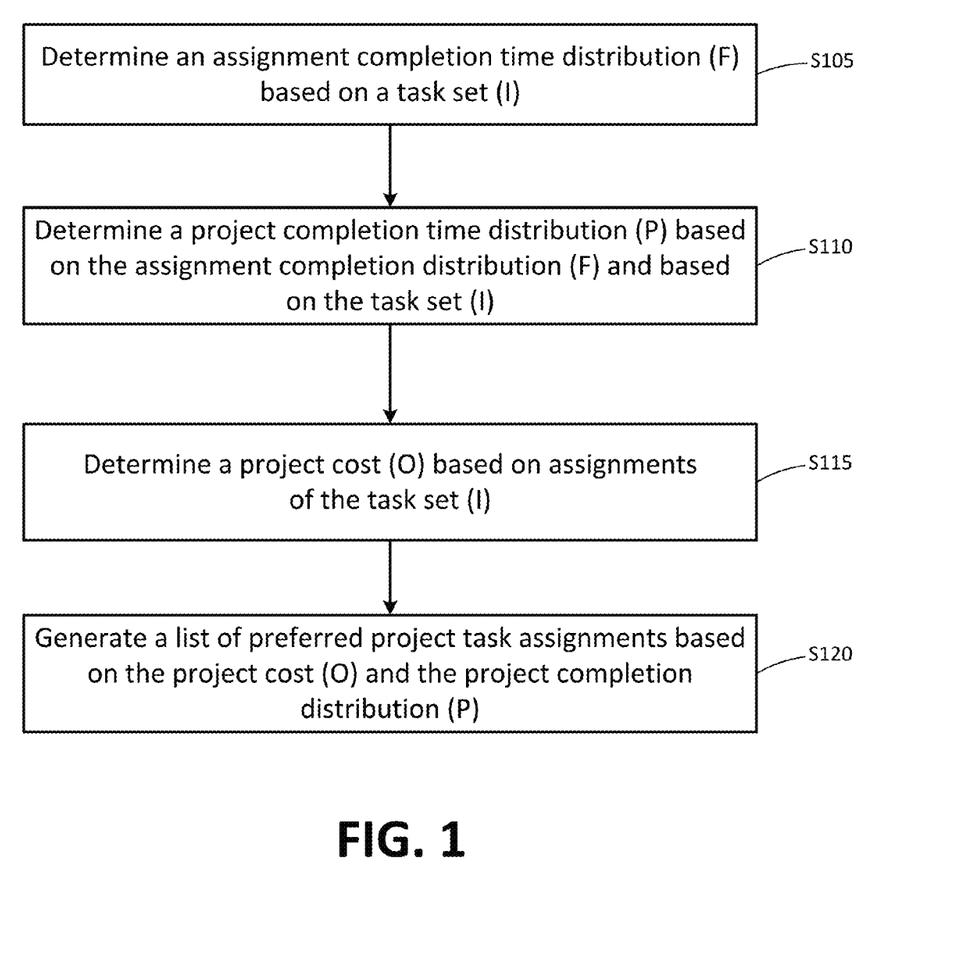
FIG. 1 illustrates a method according to at least one example embodiment.
Figure 2:
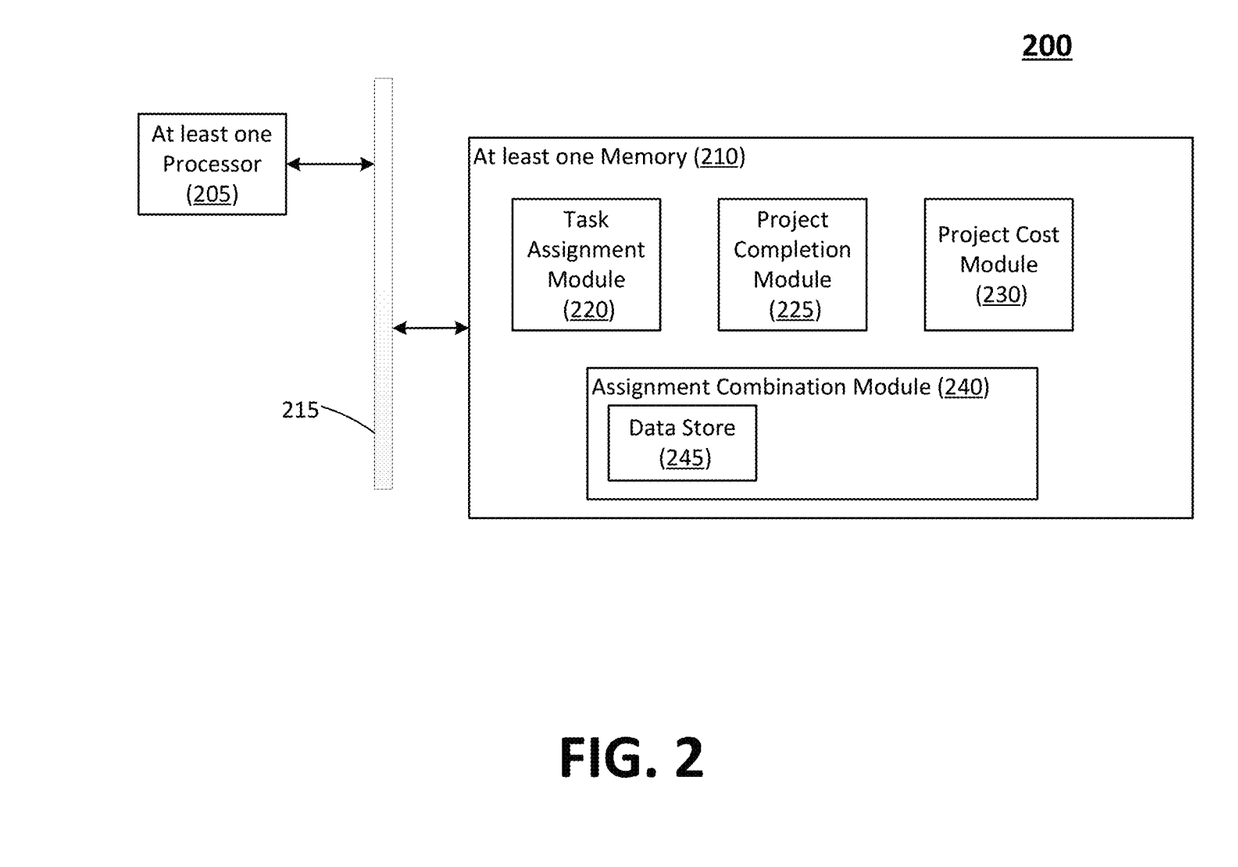
FIG. 2 illustrates a block diagram of a system according to at least one example embodiment.

FIG. 1 illustrates a method according to at least one example embodiment. The method steps described with regard to FIG. 1 may be executed as software code stored in a memory (e.g., at least one memory 210 described below) associated with a system (e.g., as shown in FIG. 2) and executed by at least one processor (e.g., at least one processor 205 described below) associated with the system. However, alternative embodiments are contemplated such as a system embodied as a special purpose processor.

For example, the method steps may be performed by an application-specific integrated circuit, or ASIC. For example, the ASIC may be configured as one or more of the blocks, or elements of the blocks, (e.g., the assignment module 220 described below) and/or the system 200. Although the steps described below are described as being executed by a processor, the steps are not necessarily executed by a same processor. In other words, at least one processor may execute the steps described below with regard to FIG. 1.

As shown in FIG. 1, in step S105 a processor (e.g., at least one processor 205) determines an assignment completion time distribution (F) based on a task set (I). For example, the processor may iteratively assign each of a plurality of tasks to an entity (e.g., an in-house work group or a sub-contractor) that is capable of completing the assigned task. The tasks may be iteratively assigned one at a time while holding the remaining task assignments fixed. Each of the entities may have a corresponding period of time (e.g., number of days) to complete the task. For example, an in-house work group may complete (or agree to complete) the task in three days, whereas a sub-contractor may complete (or agree to complete) the task in four days. As a result, the completion time distribution for the example task may be three to four days or 3.5+/−0.5 days. Although the example describes two entities as possible candidates for assignment of the task, example embodiments are not limited thereto.

In step S110 the processor determines a project completion time distribution (P) based on the assignment completion time distribution (F) and based on the task set (I). For example, the processor may determine a period of time to complete a project based on all, or a subset, of the combinations of task assignments and the corresponding completion time distribution (F) for the tasks. In other words, the processor may generate a list of task assignments for the project. The list may include the task assignment (e.g., which entity the task is assigned to), an amount of time to complete the task by the assigned entity and a total time to complete the project. The total time to complete the project may be a sum of task completion times. Alternatively, or in addition to, the total time to complete the task may be based on task groupings (e.g., tasks completed in parallel and/or task dependencies (e.g., a first task start time is based on a second task completion time).

In step S115 the processor determines a project cost (O) based on assignments of the task set (I). For example, the project may have a fixed cost based on the task assignment (e.g., which entity the task is assigned to) and a risk cost based on a probability the project is not completed on time. The fixed cost may be contractual (e.g., based on a contract with a sub-contractor) or in-house cost structures. The risk cost may be based on a time distribution, a quality of service (QoS) agreement with a sub-contractor, historical data associated with a sub-contractor or an in-house work group, and/or statistical norms. The processor may determine the project cost (O) based on the fixed cost and the risk cost for each task assignment for the project. The processor may determine the project cost (O) based on a weighted sum of the fixed cost and the risk cost for each task assignment for the project. The project cost (O) may be added to the list of task assignments for the project.

In step S120 the processor generates a list of preferred (or best case) project task assignments based on the project cost (O) and the project completion time distribution (P). For example, as discussed above, the processor may generate a list of task assignments for the project including the period of time to complete the project for each of the task assignment combinations and the project cost (O). The processor may rank or sort the list based on the period of time to complete the project and the project cost (O). The processor may filter the list based on the period of time to complete the project and the project cost (O).

FIG. 2 illustrates a block diagram of a system according to at least one example embodiment. As shown in FIG. 2, the system (or apparatus) 200 includes at least one processor 205 and at least one memory 210. The at least one processor 205 and the at least one memory 210 are communicatively coupled via bus 215. The system 200 may be, for example, an element of a computing device (e.g., a cloud computing device, a server or a personal computer.

In the example of FIG. 2, the system 200 may be at least one computing device and should be understood to represent virtually any computing device configured to perform the methods described herein. As such, the system 200 may be understood to include various standard components which may be utilized to implement the techniques described herein, or different or future versions thereof. By way of example, the system 200 is illustrated as including the at least one processor 205, as well as the at least one memory 210 (e.g., a non-transitory computer readable storage medium) respectively.

Thus, as may be appreciated, the at least one processor 205 may be utilized to execute instructions stored on the at least one memory 210, so as to thereby implement the various features and functions described herein, or additional or alternative features and functions. Of course, the at least one processor 205 and the at least one memory 210 may be utilized for various other purposes. In particular, it may be appreciated that the at least one memory 210 may be understood to represent an example of various types of memory and related hardware and software which might be used to implement any one of the modules described herein. Systems and/or methods described below may include data and/or storage elements. The data and/or storage elements (e.g., data base tables) may be stored in, for example, the at least one memory 210.

As shown in FIG. 2, the at least one memory 210 includes a task assignment module 220, a project completion module 225, a project cost module 230, and an assignment combination module 240. The assignment combination module 240 includes a data store 245.

The task assignment module 220 may be configured to assign each of a plurality of tasks (e.g., input as a project) to an entity (e.g., an in-house work group or a sub-contractor) that is capable of completing the assigned task. A task assignment may be based on at least one input parameter. The at least one input parameter may include, for example, a set of tasks (e.g., defining the workflow and/or the project), a set of candidate entities (e.g., entities qualified to perform a task), a target completion time (e.g., a target task or target project completion time), an assignment completion probability, historical data (e.g., entity completion statistics), and/or user inputs (e.g., a selection of one of the candidate entities for assignment of a task).

The task assignment module 220 may be configured to generate an assignment completion time distribution (F) based on a task set (I). The assignment completion time distribution (F) may be further based on the at least one input parameter. The assignment completion time distribution (F) may include a time distribution corresponding to a projected completion time and/or time range for each of the assigned tasks. The assignment completion time distribution may include a time distribution or time range for each task in the task set (I). The time distribution or time range may be based on a completion time associated with each of a set of candidate assignments including, for example, the candidate entities and the target completion time.

Figure 7:
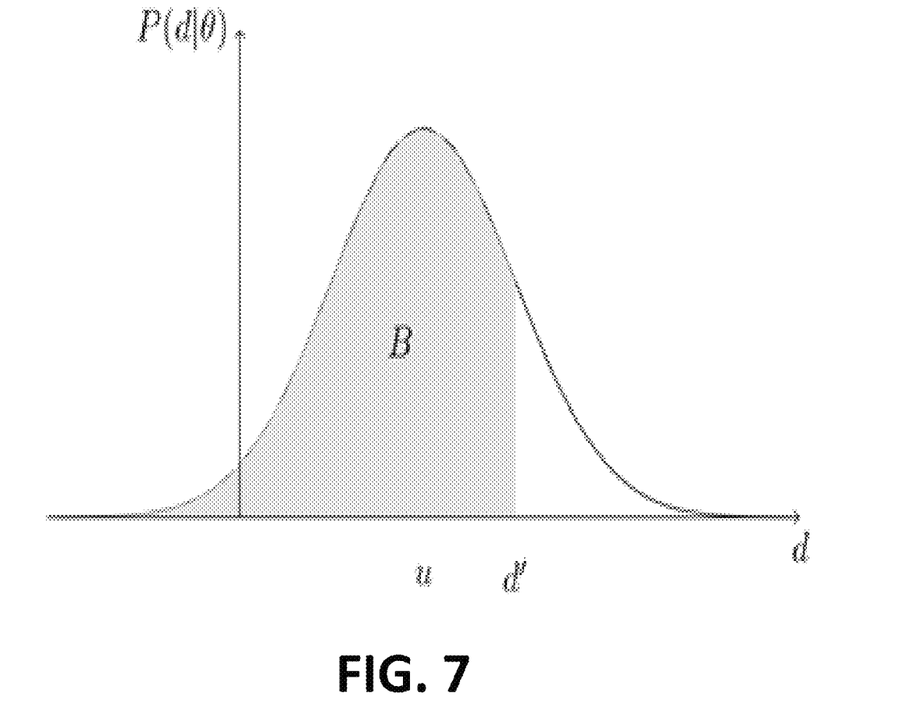
FIG. 7 illustrates a graph of distribution delays and assignment completion probabilities according to at least one example embodiment.

In some implementations, the task assignment module 220 may determine the assignment completion time distribution (F) as a function over time (typically in days). Therefore, any function that satisfies $F(t)=0$ if $t<0$, $F(t)\geq 0$ if $t\geq 0$ and $$\int_{-\infty}^{+\infty} F(t)\,dt = 1$$

$$\left(\sum_t F(t) = 1\right)$$

for discrete version) could be a candidate for the time distribution. Further, a specific form of probability density/mass function $P(d|\theta)$ may be chosen in order to model an assignment's delay, where d represents the number of days delayed for the assignment and $\theta$ represents the parameters. The parameters may be set by the user or inferred from historical data. For example, using a Gaussian distribution $$\left(P(d\mid \mu, \sigma) = \frac{1}{\sigma\sqrt{2\pi}}\exp\left[-\frac{(d-\mu)^2}{2\sigma^2}\right]\right)$$

to model delayed days, $\mu$ could be the mean of all delayed days (of a specific entity) and $\sigma$ could be the standard deviation of all delayed days (of a specific entity). If a related assignment completion probability B is unknown (which could be changed by different contract), the assignment completion time distribution may be $F(t)=P(t-T|\mu,\sigma)$. The distribution may be normalized to ensure $F(t)=0$ if $t<0$. However, it may be computationally more efficient to change the value of t to 0 if $t<0$ in the sampling processes and risk analysis described herein. If the assignment completion probability B is provided, F(t) may be computed by shifting through $P(d|\theta)$. If $P(d|\theta)$ is a Gaussian distribution in the form of $P(d|\mu,\sigma)$ and the point that its commutative distribution has the value of B is $B=d'(\int_{-\infty}^{d'} P(d|\mu,\sigma)\,dt)$, as shown in FIG. 7, a corresponding assignment completion time distribution F may be $F(t)=P(t-T+d'|\mu,\sigma)$. As a result, $B=\int_{-\infty}^{T} F(t)dt$, where T is the target completion time.

The project completion module 225 may be configured to determine a project completion distribution (P) based on the assignment completion time distribution (F) and based on the task set (I). For example, the project completion module 225 may determine a period of time to complete a project based on all, or a subset, of the combinations of task assignments and the corresponding assignment completion distribution (F) for the tasks. The project completion time distribution may be based on at least one input parameter. The at least one input parameter may include, for example, a set of tasks (e.g., defining the workflow and/or the project), a set of prerequisite tasks (e.g., a first task start time is based on a second task completion time), assignment combinations, and the assignment completion distribution (F).

Figure 5:
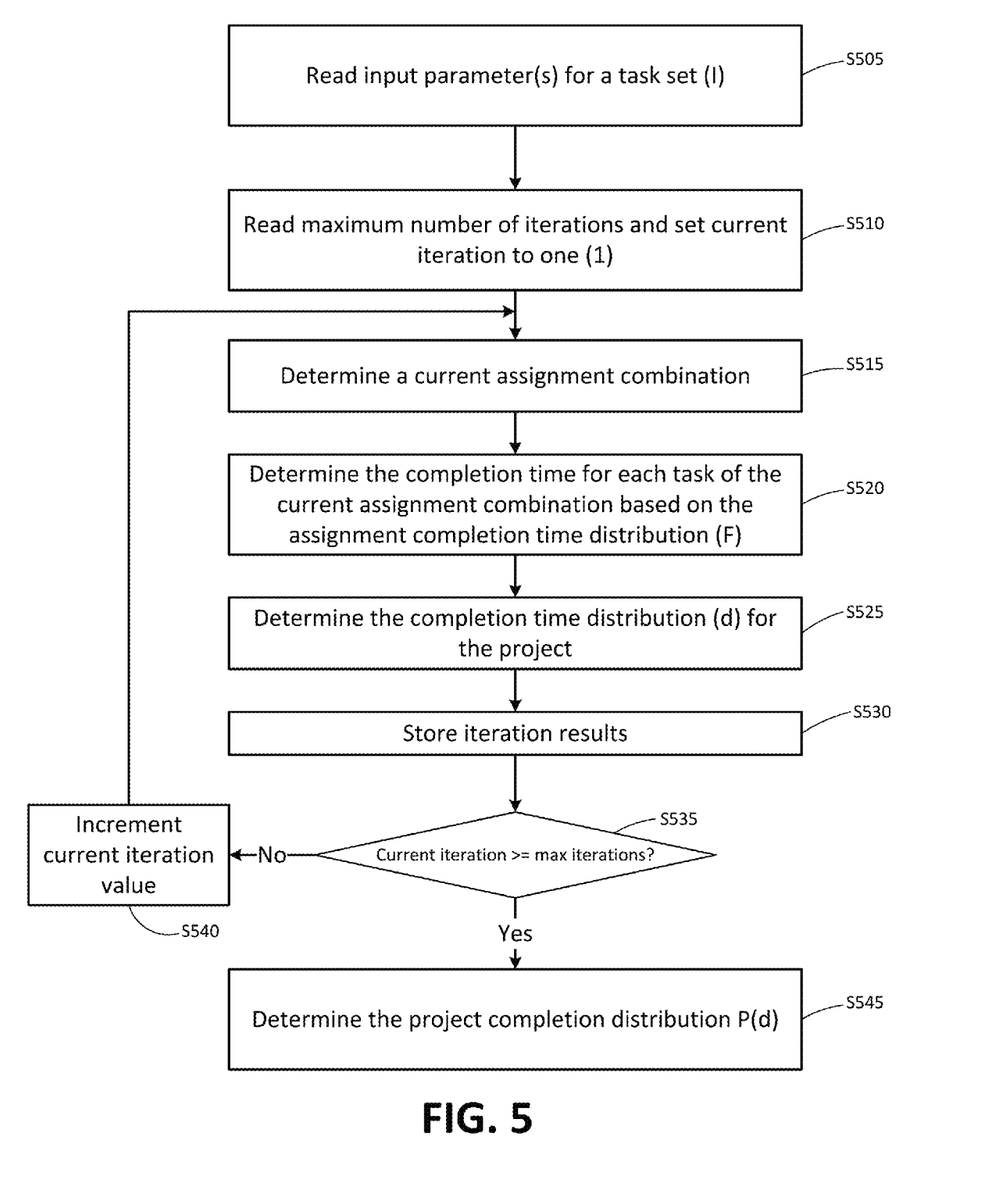
FIG. 5 illustrates another method according to at least one example embodiment.

In some implementations, the project completion module 225 may be configured to determine a project completion time distribution (P). According to example embodiments, a Monte Carlo method may be used to simulate the project completion time distribution. For example, in each iteration, the completion time for each task is sampled, and the project completion time may be determined based on the sampled completion time for each task. According to the Law of Large Number, if the number of iterations is large enough, the sample distribution of project completion times should approach the true distribution. The method for computing project completion time distribution is described in more detail below with regard to FIG. 5. Assuming the assignment completion time for task i in one iteration is $t_i$, where $i\in I$, each task's ending time could be computed in an recursive way and the ending time of task "End" would be the completion time of the project (assuming the ending time of task "Start" is 0). The EndTime function may be defined as follows:

```
def EndTime(Task i):
    if Task i is the Start task:
        return 0
    else:
        forall j in Prerequisite(i):
            pre_end_time[j] = EndTime(Task j)
        return t_i + max(pre_end_time)
```

Accordingly, the project completion time of this iteration may be d=EndTime(Task End).

The project cost module 230 may be configured to determine a project cost (O) based on assignments of the task set (I). For example, as discussed above, the project may have a fixed cost based on the task assignment (e.g., which entity the task is assigned to) and a risk cost based on a probability the project is not completed on time. The project cost (O) may be based on at least one input parameter. The at least one input parameter may include, for example, a set of tasks (e.g., defining the project), a set of candidate entities (e.g., entities qualified to perform a task), assignment costs associated with the set of candidate entities, and assignment combinations.

Figure 8:
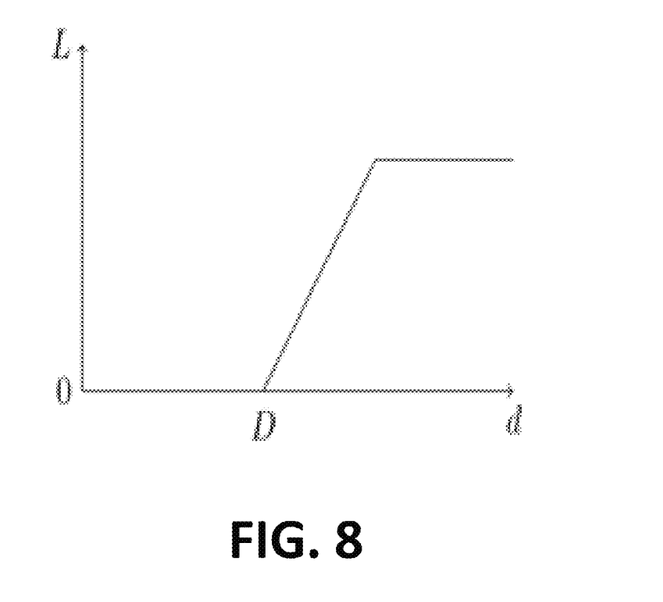
FIG. 8 illustrates a graph of a penalty function versus project completion time according to at least one example embodiment.

In some implementations, for an assignment combination, the total cost of the project may be the summation of all tasks $O=\Sigma_d L(d)P(d)$. Further, The whole project may have a target completion time D. Based on project completion time distribution P, the overdue probability of the project may be determined as $V=\Sigma_{d>D}P(d)$. If the overdue probability is high, the project has higher risk. There could be a penalty function L(d) for the completion time of the project. If the project is completed in time, the penalty could be zero or even a negative value. If the project is not completed in time, the penalty may be a positive value. The penalty function should be non-decreasing function, which means that longer overdue gets higher penalty. FIG. 8 shows an example of the penalty function. The expected penalty of a certain assignment combination may be determined as $U=\Sigma_d L(d)P(d)$.

Accordingly, in some implementations, cost module 230 may be configured to determine a combined cost. The combined cost of an assignment combination may be determined as a weighted sum of its cost and expected penalty (or risk) $E=w_1 O+w_2 U$, where $w_1$ and $w_2$ are the weights. A relative higher $w_1$ indicates more emphasis over cost control and a higher $w_2$ indicates more emphasis over risk control.

The assignment combination module 240 may be configured to generate a list of preferred (or best case) project task assignments based on the project cost (O) and the project completion time distribution (P). The assignment combination module 240 may include at least one input parameter. The at least one input parameter may include, for example, the project cost (O), the project completion distribution (P), an overdue penalty (e.g., a penalty for completing a task late), and a weight setting (e.g., a weight associated with the fixed cost and the risk cost). The list may include task assignments for the project including the period of time to complete the project for each of the task assignment combinations and the project cost (O). The assignment combination module 240 may rank or sort the list based on the period of time to complete the project and the project cost (O). The assignment combination module 240 may filter the list based on the period of time to complete the project and the project cost (O). Alternatively, or in addition to, the assignment combination module 240 may maintain a list of a predetermined size. Upon determining a new entry is preferred over an existing entry, the existing entry may be dropped from the list. Foe example, upon determining a new entry is ranked above an lowest ranked existing entry, the existing entry is dropped from the list and the new entry is added to the list. The list may be stored in data store 245.

Figure 3:
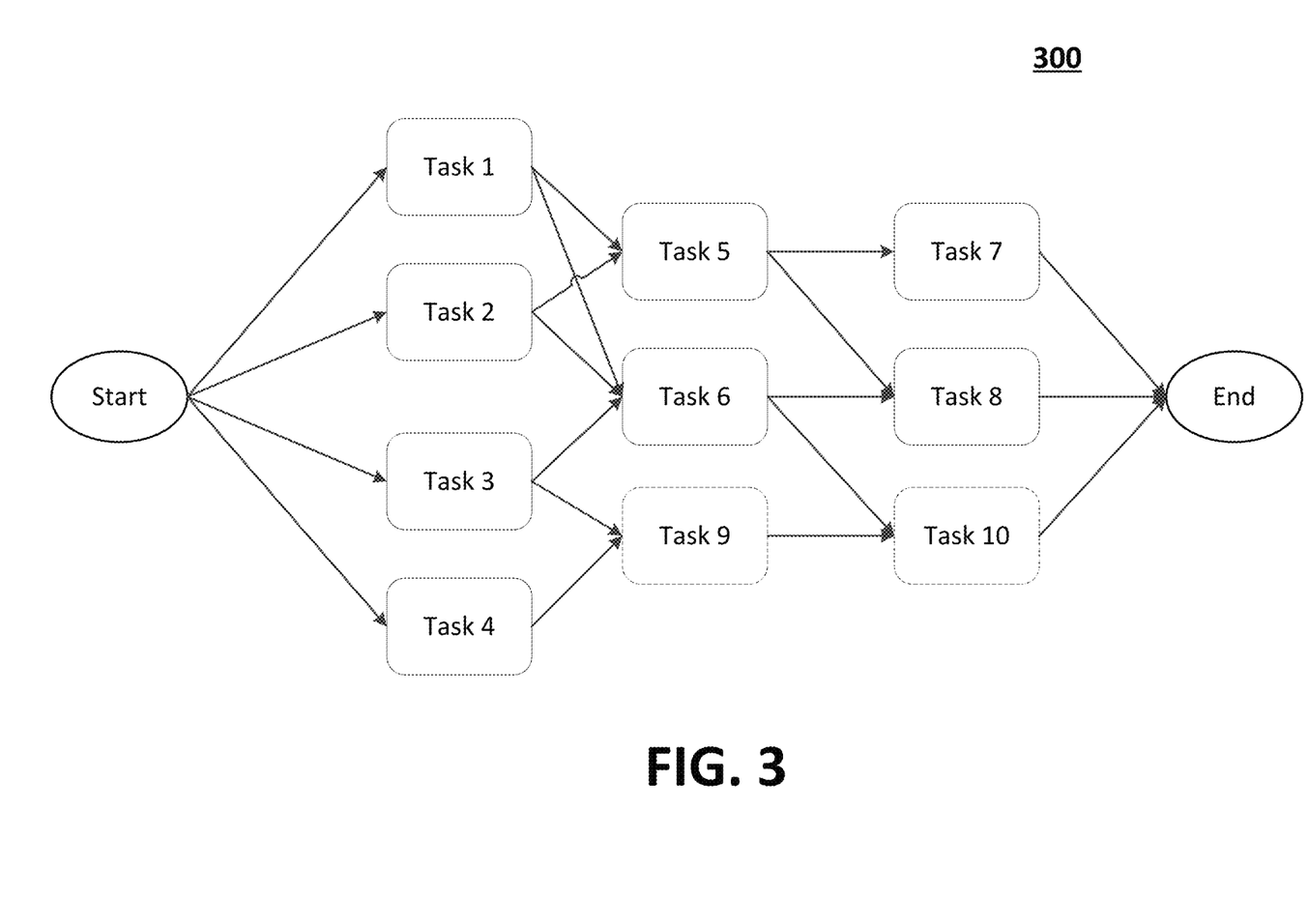
FIG. 3 illustrates a block diagram of a task flow according to at least one example embodiment.

FIG. 3 illustrates a block diagram of a task flow according to at least one example embodiment. As shown in FIG. 3, the task flow 300 includes a number of tasks Task 1-Task 10. Tasks may be required tasks (e.g., Task 1-Task 8, shown with a solid outline) and optional tasks (e.g., Task 9 and Task 10, shown with a dashed outline). Tasks may be dependent on the completion of another task. For example, Task 6 is shown as dependent on the completion of Task 1, Task 2 and Task 3. A task (e.g., Task 1-Task 10) may be any operation, function, job, contract, and/or the like that takes a period of time (e.g., a number of days) to complete.

The task flow 300, including a number of tasks, may be referred to as a project. To complete a project, a task may be assigned to any number of entities (or groups) internal to the organization and external to the organization. Accordingly, completion of the project may be reliant on the internal and external entities (as entities qualified to perform a task) for completion. As a result, assignment of the tasks to the internal and external entities may dictate the success of the project, time to complete the project and/or risks associated with completion of the project. For example, an internal entity may be resource limited (e.g., a limited number of personnel), but may be more likely to complete a task on time. By contrast, an external entity may provide organizational flexibility (e.g., an unlimited number of personnel), but may add risk as to whether or not a task will be completed on time. As a result, external entity may have associated (e.g., contractual and/or historical) quality of service parameters regarding the completion of tasks.

According to example embodiments, for a project that may require collaborative efforts from different entities, control over the timing of different tasks may be desired because different entities may have other projects to work on and the time frame for their availability may be limited. Some optional tasks in a project may be eliminated to ensure the quality of important tasks and to accomplish tasks within a entities time limit and/or availability. However, eliminating optional tasks may cause losses to other objectives (e.g., losing the revenue would have been created by these optional tasks).

Making task assignment decisions while balancing different objectives may be enhanced by detailed quantitative analysis. Some implementations allow the option to contract third-party entities to perform some tasks. The contract may take on different forms, including subcontract and outsourcing, both of which are common practices in business world. This creates lots of benefits (e.g., reducing total cost and control the number of employees) and also raises some challenges (e.g., risk of overdue and drop of task completion quality). Contractors could provide quality of service (QoS) guarantees, which could ensure that the task assigned to the contractor would be accomplished on time. However, contracting tasks may be more expensive with QoS guarantees than completing a task without QoS guarantee.

Example embodiments can be characterized by at least one input parameter, at least one determined dataset, and at least one output as follows:

Input

Set I: the set of all tasks in the project, indexed by i;

Prerequisite task sets R: the set of tasks that should be finished before the start of task i could represented as $R_i$, indexed by j prerequisite task for task i could represented as $R_{ij}$;

Candidate assignment sets A: the set of teams that task i can be assigned to could be represented as $A_i$, including same team but with different contract terms (e.g., with or without QoS guarantee), indexed by k, (an assignment for task i could represented as $A_{ik}$;

Assignment costs C: the cost of task i if assigned to $A_{ik}$ could be represented as $C_{ik}$;

Target assignment completion time T: the target completion time of task i if assigned to $A_{ik}$ could be represented as $T_{ik}$; and In time assignment completion probabilities B: the probability for task i to be completed within target completion time if assigned to $A_{ik}$ could be represented as $B_{ik}$.

Determined Dataset

Assignment completion time distribution F: the distribution of completion time of task i if assigned to $A_{ik}$ could be represented as $F_{ik}$; then the probability that task i would need t days to finish if assigned to $A_{ik}$ is $F_{ik}(t)$.

Output

The top-k assignment combinations X: the list consists of k best assignment combinations, indexed by l; for each assignment combination l, each task i is assigned to a specific contract $X_{li}, X_{li} \in A_i$;

The costs of top-k assignment combinations O: the cost of each assignment combination l is $O_l$;

The project completion time distributions of top-k assignment combinations P: the project completion time distribution of each assignment combination l is $P_l$.

Figure 4:
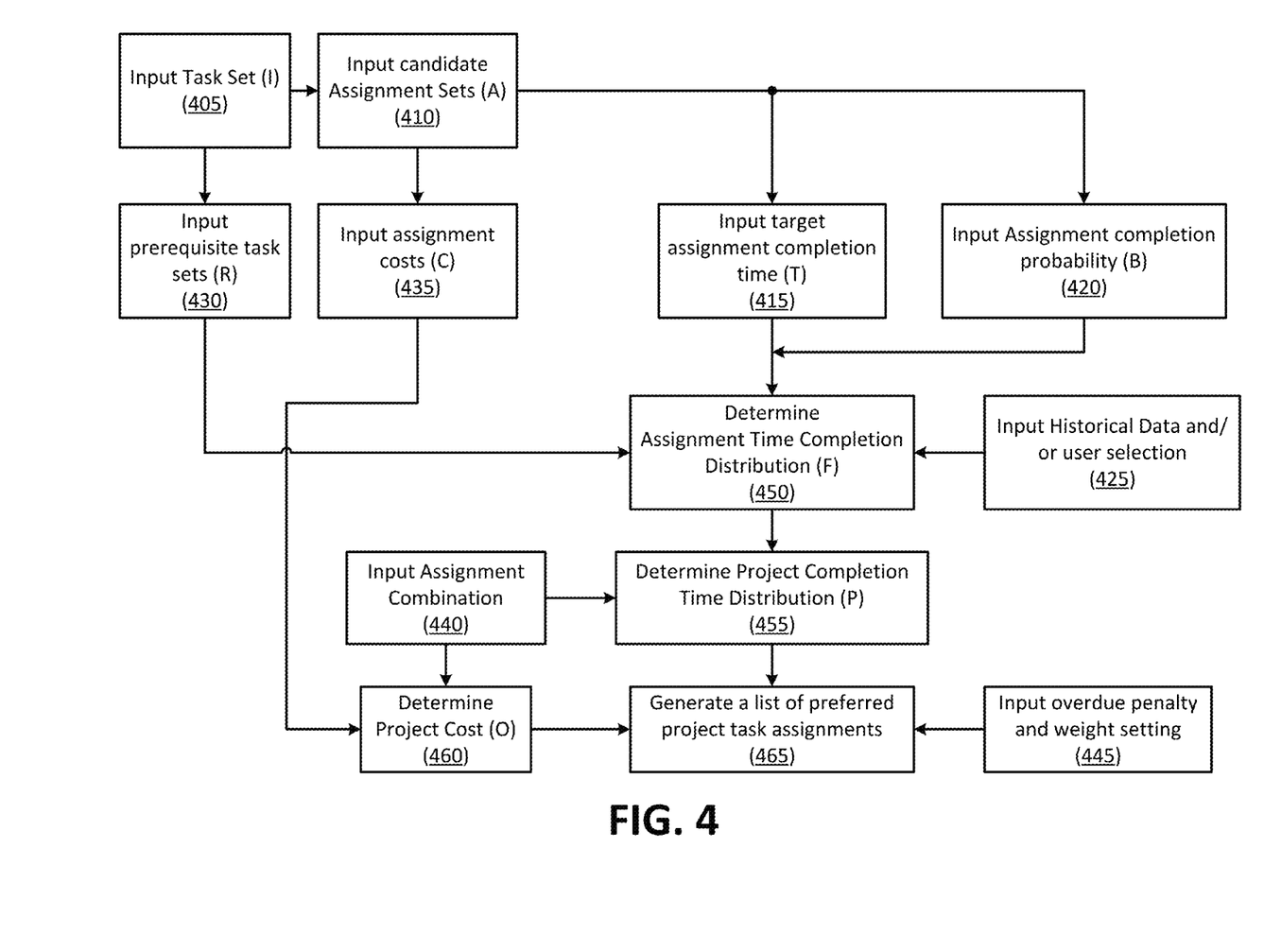
FIG. 4 illustrates a block diagram of a data flow according to at least one example embodiment.

FIG. 4 illustrates a block diagram of a data flow according to at least one example embodiment. As shown in FIG. 4, the data flow may include a number of inputs and a number of processes based on the inputs and/or other processes. For example, the inputs include input task set (I) 405, input candidate assignment sets (A) 410, input target assignment completion time (T) 415, input assignment completion probability (B) 420, input historical data and/or user selection 425, input prerequisite task sets (R) 430, input assignment costs (C) 435, input assignment combination 440, and input overdue penalty and weight setting 445. For example, the processes include determine assignment completion time distribution (F) 450, determine project completion distribution (P) 455, determine project cost (O) 460, and generate a list of preferred project task assignments 465.

As shown in FIG. 4, one input may be based on another. For example, the input candidate assignment sets (A) 410 may be based on the input task set (I) 405. In this example, the candidate assignment sets (A) 410 may be filtered to include candidates (as entities) that are qualified to complete and/or have bid on a task that in the input task set (I) 405. For example, the input target assignment completion time (T) 415 may be based on both the input candidate assignment sets (A) 410 and the input task set (I) 405. In this example, the input target assignment completion time (T) 415 may differ based on input candidate assignment sets (A) 410 for each task in the input task set (I) 405. Accordingly, a first candidate (or entity) may target completion of four days, while a second candidate (or entity) may have a target completion of five days.

Figure 6:
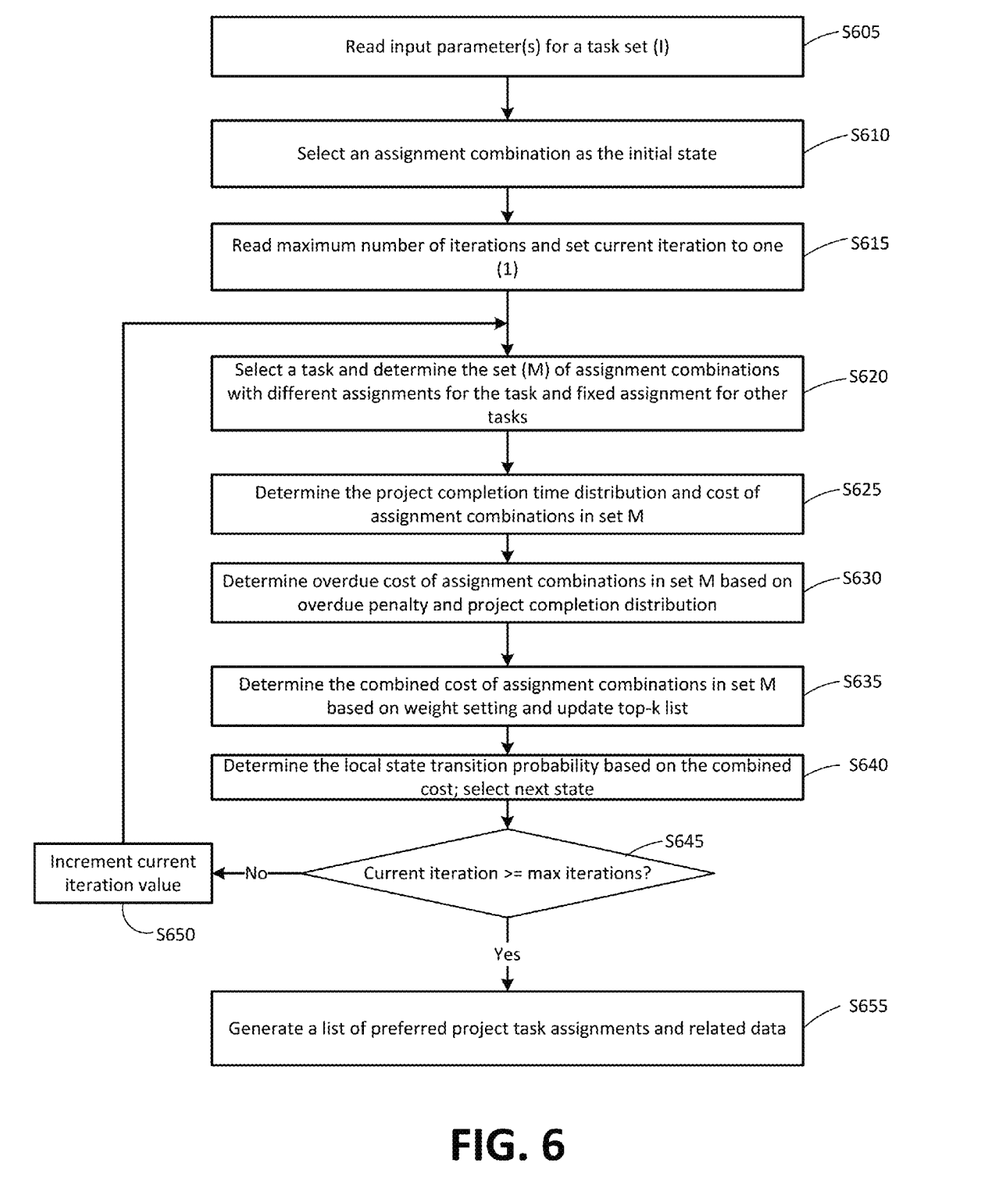
FIG. 6 illustrates yet another method according to at least one example embodiment.

FIGS. 5 and 6 illustrate methods according to example embodiments. The method steps described with regard to FIGS. 5 and 6 may be executed as software code stored in a memory (e.g., at least one memory 210 described below) associated with an apparatus (e.g., as shown in FIG. 2) and executed by at least one processor (e.g., at least one processor 205 described below) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 5 and 6.

FIG. 5 illustrates another method according to at least one example embodiment. As shown in FIG. 5, in step S505 a processor (e.g., at least one processor 205) reads input parameter(s) for an input task set (I). The input parameter(s) may include at least one of an assignment combination, a prerequisite task set (R), and an assignment completion time distribution (F). For example, the project completion module 225 may read the input parameters as user input. Alternatively, or in addition to, the input parameters may be read from a storage location associated with the memory 210. Further, the assignment completion distribution (F) may be read from a storage location associated with the task assignment module 220.

In step S510 the processor reads a maximum number of iterations and sets a current iteration to one (1). For example, the project completion module 225 may read the maximum number of iterations as user input. Alternatively, the maximum number of iterations may be a design choice stored in the project completion module 225 as a modifiable parameter. The current iteration may be a program variable initially set to one (1).

In step S515 the processor determines a current assignment combination. For example, the assignment completion time distribution (F) may be a file defined as a data set that can be indexed (e.g., a data table or XML file). Accordingly, a row of the data set may be selected. In one example implementation the row may be selected using the index number.

In some example implementations, one task assignment may vary while holding the remainder of task assignments constant or fixed. For example, the one task may have N possible assignment candidates (or entities). Accordingly, determining the current assignment combination may include selecting one of the N possible assignment candidates (or entities). If using a deterministic method, the selected candidate may be a best candidate (e.g., lowest cost or fastest completion period). However, as described above, when using a deterministic method, local optimizations may occur (e.g., two tasks may change task assignments repeatedly to the detriment of global optimization). Example embodiments may utilize a stochastic local optimization method to avoid local optima and to reduce computation resource utilization and costs. In a stochastic local optimization method, a task may be assigned in a non-optimal fashion in order to drive global (e.g., project optimization). In other words, in the stochastic local optimization method a task may be assigned in a second best, a third best or even a worst case assignment, so long as the task assignments for all tasks results in a best or optimized project result.

Accordingly, using the stochastic local optimization method, selecting one of the N possible assignment candidates (or entities) for determining the current assignment combination may include sampling the N possible assignment candidates (or entities). For example, the N possible assignment candidates (or entities) may be sampled using a "Monte Carlo" method. As a result the assignment candidate (or entity) may be selected randomly. Further, the assignment candidate (or entity) may be selected randomly based on a probability distribution. A probability distribution may be based on a cumulative distribution function (CDF) (e.g., the probability that the random variable used to select the assignment candidate (or entity) is no larger than a given value) based on N.

In some example implementations, a data set associated with the assignment completion time distribution (F) may be generated that includes all possible assignment combinations. In this example, the number of rows in the data set associated with the assignment completion distribution (F) may exceed the maximum number of iterations. Accordingly, the data set may be sampled. For example, the data set may be sampled using a "Monte Carlo" method. As a result the row may be selected randomly. Further, the row may be selected randomly based on a probability time distribution. A probability distribution may be based on a CDF (e.g., the probability that the random variable used to select the row is no larger than a given value) based on the number of task assignment variations associated with the assignment completion time distribution (F).

In some implementations, the current assignment combination may be based on the read assignment combination. For example, the assignment combination may specify certain tasks be performed by a desired entity. As a result, the assignment completion distribution (F) may be filtered to include assignments where the task is assigned to the desired entity. As another example, the assignment combination may specify certain tasks not be performed by an undesirable entity. As a result, the assignment completion time distribution (F) may be filtered to exclude assignments where the task is assigned to the undesirable entity. As another example, combinations of tasks may preferable be assigned (or not assigned) to combinations of entities. For example, two that should be performed in parallel may not be assigned to the same entity.

In some implementations, the current assignment combination may be based on the read prerequisite task sets. For example, the assignment combination may specify certain tasks be performed in a specific order (e.g., a first task start time is based on a second task completion time). As a result, the assignment completion distribution (F) may be filtered to exclude assignments where prerequisite task sets are not satisfied. Accordingly, in some implementations, the data set based on the assignment completion time distribution (F) may be sampled following a filter operation based on assignment combinations and/or prerequisite task sets.

In step S520 the processor determines the completion time for each task of the current assignment combination based on the assignment completion time distribution (F). For example, the data set may be based on the assignment completion time distribution (F) may include a target completion time for each assignment based on the candidate (or entity) assigned to the task. Accordingly, each assigned task in the assignment completion distribution (F) may have an associated completion time based on the target completion time.

In step S525 the processor determines the completion time (d) for the project. For example, in one example implementation, the project completion module 225 may determine the completion time (d) as the longest cumulative time associated with dependent tasks. For example, referring to FIG. 3, the task completion path including Task 1, Task 5 and Task 7 may have a longer cumulative time than the task completion path including Task 2, Task 6 and Task 8 given a task assignment resulting in a shortest project completion period and/or a task assignment resulting in a project completion that is on time, within budget, having the lowest risk and/or some other business requirement and/or some combination thereof. Accordingly, the completion time (d) may be the cumulative time associated with Task 1, Task 5 and Task 7.

In another example implementation, tasks may not only be dependent on other tasks, but may be grouped together. For example, Task 1-Task 4 may be grouped together (shown as a column of tasks), Task 5 and Task 6 may be grouped together (shown as a column of tasks) and Task 7 and Task 8 may be grouped together (shown as a column of tasks). In this example, Task 2 may have the longest associated completion time for its group, Task 5 may have the longest associated completion time for its group, and Task 8 may have the longest associated completion time for its group given a task assignment resulting in a shortest project completion period and/or a task assignment resulting in a project completion that is on time, within budget, having the lowest risk and/or some other business requirement and/or some combination thereof. Accordingly, the completion time (d) may be the cumulative time associated with Task 2, Task 5 and Task 8. In any example implementation, optional tasks (e.g., Task 9 and Task 10) may or may not be considered in the completion time (d).

In step S530, the processor stores iteration results. For example, the project completion module 225 may store a record including data associated with the selected assignment completion time distribution (F) together with the completion time (d). The record may be stored in the memory 210 and/or in a memory associated with the project completion module 225.

In step S535 the processor determines if the current iteration is greater than or equal to the maximum number of iterations. For example, the project completion module 225 may compare the current iteration value to the maximum number of iterations. If the current iteration is greater than or equal to the maximum number of iterations processing continues to step S545. Otherwise, processing continues to step S540.

In step S540 the processor increments the current iteration value. For example, the project completion module 225 adds one (1) to the current iteration value. In step S545 the processor determines the project completion distribution P(d). For example, the project completion module 225 may read each of the stored iteration records and determine the project completion distribution P(d) as described above. The project completion module 225 may generate a record set as the project completion time distribution P(d). The record set may include each of, or a subset of, the read iteration records.

FIG. 6 illustrates yet another method according to at least one example embodiment. In a state transition process (shown in FIG. 6), the assignment of one task may be changed holding the assignment of the remaining tasks constant. Therefore, the number of candidate local states of task i is equal to the size of its candidate assignment set $A_i$. For all $j \in A_i$, a related assignment combination's combined cost $E_j$ may be determined. The costs may be compared with an existing top-k list and select top-k from them as the new top-k list. The state transition probability $P_s(j)$ may be determined using Boltzmann distribution, upon which the state with lower combined cost has higher probability.

$$P_s(j) = \frac{\exp\left(-\frac{E_j}{T}\right)}{Z(T)} \qquad (1)$$

$$Z(T) = \sum_{j \in A_i} \exp\left(-\frac{E_j}{T}\right) \qquad (2)$$

Where T is the "temperature" parameter and should be non-negative. When $T \to +\infty$, every local state has the same probability. When $T=0$, the probability of the local state with lowest combined cost is 1 and the probability of all other local states is 0. Accordingly, T may be a fixed value during the whole algorithm or T may be determined using simulated annealing schema (e.g. T could be set as a high value and lowered until a change in eqns. 1 and/or 2 asymptotically reach a value). With simulated annealing, T has higher values in earlier iterations and has lower values in later iterations. Within each iteration, the transition probability $P_s(j)$ is computed using eqns. 1 and 2. By sampling over the transition probability, a next state is chosen and the method continues with the next iteration.

As shown in FIG. 6, in step S605 a processor (e.g., at least one processor 205) reads input parameters for task set (I). The input parameters may include, for example, at least one of overdue penalty, weight setting, task set (I), prerequisite task sets (R), assignment completion time distribution (F), assignment costs (C), and/or the like. For example, the assignment combination module 240 may read the input parameters as user input. Alternatively, or in addition to, the input parameters may be read from a storage location associated with the memory 210. Further, the assignment completion time distribution (F) may be read from a storage location associated with the project completion module 225 and the assignment costs (C) may be read from a storage location associated with the project cost module 230.

In step S610 the processor selects an assignment combination as the initial state. For example, the assignment combination module 240 selects an assignment combination from the assignment completion time distribution (F), as the initial state. For example, the assignment combination module 240 may select tasks associated with a project (e.g., task set (I)) and assign all tasks as an initial state.

In step S615 the processor reads maximum number of iterations and sets a current iteration value to one (1). For example, the assignment combination module 240 may read the maximum number of iterations as user input. Alternatively, the maximum number of iterations may be a design choice stored in the assignment combination module 240 as a modifiable parameter. Alternatively, the maximum number of iterations may be based on the number of tasks in task set (I). The current iteration may be a program variable initially set to one (1).

In step S620 the processor selects a task and determines the set (M) of assignment combinations with different assignments for the task and fixed assignment for other tasks. For example, the set (M) of assignment combinations may have N possible assignment candidates (or entities). Accordingly, determining the current assignment combination may include selecting one of the N possible assignment candidates (or entities). If using a deterministic method, the selected candidate may be a best candidate (e.g., lowest cost or fastest completion period). However, as discussed above, when using a deterministic method, local optimizations may occur (e.g., two tasks may change task assignments repeatedly to the detriment of global optimization). Example embodiments may utilize a stochastic local optimization method. In a stochastic local optimization method, a task may be assigned in a non-optimal fashion in order to drive global (e.g., project optimization). In other words, in the stochastic local optimization method a task may be assigned in a second best, a third best or even a worst assignment, so long as the task assignment for all tasks results in a best or optimized project result.

Accordingly, using the stochastic local optimization method, selecting one of the N possible assignment candidates (or entities) in set M for determining the current assignment combination may include sampling the N possible assignment candidates (or entities). For example, the N possible assignment candidates (or entities) may be sampled using a "Monte Carlo" method. As a result the assignment candidate (or entity) may be selected randomly. Further, the assignment candidate (or entity) may be selected randomly based on a probability distribution. A probability distribution may be based on a cumulative distribution function (CDF) (e.g., the probability that the random variable used to select the assignment candidate (or entity) is no larger than a given value) based on N.

In step S625 the processor determines the project completion time distribution and cost of assignment combinations in set M. In some implementations, the project completion module 225 reads some input parameters (see FIG. 4) and determines the project completion distribution (P) for set M. For example, the project completion time distribution for set M may be the range (over a period of time (e.g., days)) the project completes based on varying the assignment of the selected task using the M assignment candidates (or entities). For example, the project completion distribution in set M may be expressed as 10-14 days or 12+/−2 days.

In some implementations, the assignment combination module 240 receives the project completion time distribution P from the project completion module 225 and reads some additional input parameters (see FIG. 4). The assignment combination module 240 then determines the cost for each of the assignments in the project completion distribution P. For example, the cost of assignment combinations in set M may be based on some input assignment costs associated with each assignment in set M. Accordingly, the project cost based on the assignment combinations may vary based on the assignment. For example, the project cost may be expressed as a range (e.g., $1,000-$2,000) or a mean with a deviation (e.g., $1,500+/−$500).

In step S630 the processor determines overdue cost of assignment combinations in set M based on overdue penalty and project completion time distribution. For example, the assignment combination module 240 may read an input including overdue penalties. The overdue penalties may be based on the project being overdue. However, some overdue penalties may be task specific. For example, an overdue penalty may be assigned based on a number of days the project is overdue. The overdue penalty may increase as the number of days overdue increases. Continuing the above example, the project completion distribution in set M may be expressed as 10-14 days or 12+/−2 days. If a target completion date is 12 days, there is some risk (based on the project completion time distribution) that the project will be two (2) days late based on the assignments in set M. Suppose the overdue penalty is $100 for one (1) day late and $150 for two (2) days late, the overdue cost of assignment combinations in set M may be as much as $150.

In step S635 the processor determines the combined cost of assignment combinations in set M based on weight setting and update a list of preferred project task assignments. For example, the assignment combination module 240 may read an input including weights associated with fixed costs (e.g., the project cost) and risk costs (e.g., the overdue cost). In one example implementation fixed costs may be weighted (or scaled) as 0.75 and the risk costs may be weighted (or scaled) as 0.25. Accordingly, continuing the example above, the weighted worst case cost for the assignment combinations in set M may be 0.75($2000)+0.25($150)=1537.50.

In step S640 the processor determines the local state transition probability based on the combined cost and select next state. For example, the assignment combination module 240 may determine the local state transition probability by solving eqns. 1 and 2 with the combined cost as an input. Alternatively, or in addition to, the assignment combination module 240 may assign the current selected task based on the combined cost (e.g., select a mean cost assignment) and randomly select another task to vary the assignment for.

In step S645 the processor determines if the current iteration is greater than or equal to the maximum number of iterations. For example, the assignment combination module 240 may compare the current iteration value to the maximum number of iterations. If the current iteration is greater than or equal to the maximum number of iterations processing continues to step S655. Otherwise, processing continues to step S650.

In step S650 the processor increments current iteration value. For example, the assignment combination module 240 may add one (1) to the current iteration value. In step S655 the processor generates (adds to and/or modifies) a list of preferred project task assignments and related data. For example, following the completion of steps S605-S650, each task in task set (I) (e.g., the project) may be assigned. The assignment combination module 240 may store the assignment information, the project completion time and the associated costs as a list in data store 245. The assignment combination module 240 may rank or sort the list based on the project completion time and the associated costs. The assignment combination module 240 may filter the list based on the project completion time and the associated costs.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A computer-implemented method, comprising:
   determining, by at least one processor and using a stochastic local optimization method, an assignment completion time distribution associated with tasks in a task set defining a project, the assignment completion time distribution being a set of times associated with completing each task in the task set defining the project, each set of times associated with the assignment completion time distribution having at least one randomly chosen task that is non-optimal, whereas a result of the project is optimized;
   determining, by at least one processor, a time penalty for each time in the set of times associated with completing each task in the task set defining the project;
   determining, by at least one processor, a project completion time distribution based on the assignment completion time distribution and the task set;
   determining, by at least one processor, an assignment completion cost distribution including a cost associated with completing tasks in the task set, the assignment completion cost distribution being a set of costs associated with completing each task in the task set defining the project;
   determining, by at least one processor, a cost penalty for each cost in the set of costs associated with completing each task in the task set defining the project;
   determining, by at least one processor, a project cost based on assignments of the task set, the assignment completion cost distribution, the time penalty associated with the assignments of the task set and the cost penalty associated with the assignments of the task set;
   generating, by at least one processor, a list of project task assignments based on the project cost and the project completion time distribution;
   storing the generated list in a data store;
   ranking, by at least one processor, the list of project task assignments based on a weighted project cost and a weighted project completion time distribution; and
   communicating, by at least one processor, the project task assignments to respective entities that will perform the tasks.

2. The method of claim 1, wherein the assignment completion time distribution includes a time distribution or time range for each task in the task set, the time distribution or time range being based on a completion time associated with each of a set of candidate assignments.

3. The method of claim 1, wherein determining the project completion time distribution includes determining a plurality of project completion times.

4. The method of claim 1, wherein
   determining the project completion time distribution includes determining a plurality of project completion times, and
   each of the plurality of project completion times includes a randomly selected assignment for a task of the task set.

5. The method of claim 1, wherein
   determining the project completion time distribution includes determining a plurality of project completion times, and
   each of the plurality of project completion times is based on at least one of a task group and a task dependency.

6. The method of claim 1, wherein the project cost is a combined cost associated with each task of the task set, the combined cost being based on a cost associated with completing the task and a risk cost based on an overdue project, the risk cost being based on a weighted time penalty and a weighted cost penalty.

7. The method of claim 1, wherein the list of project task assignments is filtered based on the project cost and the project completion time distribution.

8. The method of claim 1, wherein
   upon determining a new entry is ranked above an lowest ranked existing entry, the existing entry is dropped from the list and the new entry is added to the list.

9. The method of claim 1, wherein the determining of the assignment completion time distribution includes:
   receiving an iteration count value;
   selecting a random task from the task set defining the project;
   assigning the completion time greater than the local optimal time to the random task;
   generating a best case assignment completion time for each task in the task set defining the project including the assigned completion time for the random task;
   determine if a number of iterations is less than the iteration count value; and
   upon determining the number of iterations is less than the iteration count value repeat the selecting, assigning and generating steps with one of a different random task or a different local optimal time.

10. The method of claim 1, further comprising using a state transition process in which an assignment of at least one of the tasks is changed holding assignments of a remainder of the tasks constant, further comprising determining a state transition probability for the state transition process using Boltzmann distribution, upon which a state with lower combined cost has higher probability.

11. The method of claim 10, wherein the Boltzmann distribution depends on a temperature parameter, the method further comprising defining the temperature parameter for the project.

12. A non-transitory computer-readable storage medium having stored thereon computer executable program code which, when executed by at least one processor in a computer system, causes the computer system to perform steps comprising:
   determine, using a stochastic local optimization method, an assignment completion time distribution associated with tasks in a task set defining a project, the assignment completion time distribution being a set of times associated with completing each task in the task set defining the project, each set of times associated with the assignment completion time distribution having at least one randomly chosen task that is non-optimal, whereas a result of the project is optimized;
   determine a time penalty for each time in the set of times associated with completing each task in the task set defining the project;

determine a project completion time distribution based on the assignment completion time distribution and the task set;

determine an assignment completion cost distribution including a cost associated with completing tasks in the task set, the assignment completion cost distribution being a set of costs associated with completing each task in the task set defining the project;

determine a cost penalty for each cost in the set of costs associated with completing each task in the task set defining the project determine a project cost based on assignments of the task set, the assignment completion cost distribution, the time penalty associated with the assignments of the task set and the cost penalty associated with the assignments of the task set;

generate a list of project task assignments based on the project cost and the project completion time distribution;

rank the list of project task assignments based on a weighted project cost and a weighted project completion time distribution; and communicate the project task assignments to respective entities that will perform the tasks.

13. The non-transitory computer-readable storage medium of claim 12, wherein the assignment completion time distribution includes a time distribution or time range for each task in the task set, the time distribution or time range being based on a completion time associated with each of a set of candidate assignments.

14. The non-transitory computer-readable storage medium of claim 12, wherein determining the project completion time distribution includes determining a plurality of project completion times.

15. The non-transitory computer-readable storage medium of claim 12, wherein
determining the project completion time distribution includes determining a plurality of project completion times, and
each of the plurality of project completion times includes a randomly selected assignment for a task of the task set.

16. The non-transitory computer-readable storage medium of claim 12, wherein
determining the project completion time distribution includes determining a plurality of project completion times, and
each of the plurality of project completion times is based on at least one of a task group and a task dependency.

17. The non-transitory computer-readable storage medium of claim 12, wherein the project cost is a combined cost associated with each task of the task set, the combined cost being based on a cost associated with completing the task and a risk cost based on an overdue project, the risk cost being based on a weighted time penalty and a weighted cost penalty.

18. The non-transitory computer-readable storage medium of claim 12, wherein the list of project task assignments is filtered based on the project cost and the project completion time distribution.

19. The non-transitory computer-readable storage medium of claim 12, wherein
upon determining a new entry is ranked above an lowest ranked existing entry, the existing entry is dropped from the list and the new entry is added to the list.

20. The non-transitory computer-readable storage medium of claim 12, wherein the determining of the assignment completion time distribution includes:
receiving an iteration count value;
selecting a random task from the task set defining the project;
assigning the completion time greater than the local optimal time to the random task;
generating a best case assignment completion time for each task in the task set defining the project including the assigned completion time for the random task;
determine if a number of iterations is less than the iteration count value; and
upon determining the number of iterations is less than the iteration count value repeat the selecting, assigning and generating steps with one of a different random task or a different local optimal time.

21. An apparatus including a processor and a non-transitory computer readable medium, the apparatus comprising:
a task assignment module executed by at least one processor and configured to:
determine, using a stochastic local optimization method, an assignment completion time distribution based on a task set defining a project, the assignment completion time distribution being a set of times associated with completing each task in the task set defining the project, each set of times associated with the assignment completion time distribution having at least one randomly chosen task that is non-optimal, whereas a result of the project is optimized,
determine a time penalty for each time in the set of times associated with completing each task in the task set defining the project,
determine an assignment completion cost distribution including a cost associated with completing tasks in the task set, the assignment completion cost distribution being a set of costs associated with completing each task in the task set defining the project,
determine a cost penalty for each cost in the set of costs associated with completing the task;
a project completion module executed by at least one processor and configured to determine a project completion time distribution based on the assignment completion time distribution and the task set;
a project cost module executed by at least one processor and configured to determine a project cost based on assignments of the task set, the assignment completion cost distribution, the time penalty associated with the assignments of the task set and the cost penalty associated with the assignments of the task set; and
an assignment combination module executed by at least one processor and configured to:
generate a list of project task assignments based on the project cost and the project completion time distribution, and
rank the list of project task assignments based on a weighted project cost and a weighted project completion time distribution;
wherein the apparatus communicates the project task assignments to respective entities that will perform the tasks.

22. The apparatus of claim 21, wherein the determining of the assignment completion time distribution includes:
receiving an iteration count value;
selecting a random task from the task set defining the project;

assigning the completion time greater than the local optimal time to the random task;

generating a best case assignment completion time for each task in the task set defining the project including the assigned completion time for the random task;

determine if a number of iterations is less than the iteration count value; and upon determining the number of iterations is less than the iteration count value repeat the selecting, assigning and generating steps with one of a different random task or a different local optimal time.

\* \* \* \* \*